Nov. 17, 1959   E. V. QUISTGAARD ET AL   2,912,874
CONTROLLING MEANS FOR HYDRAULIC CHANGE SPEED GEARINGS
Filed March 10, 1953
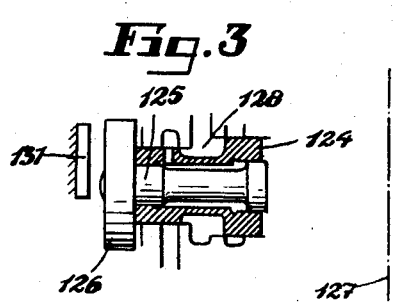
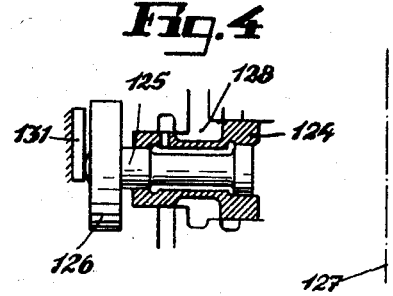
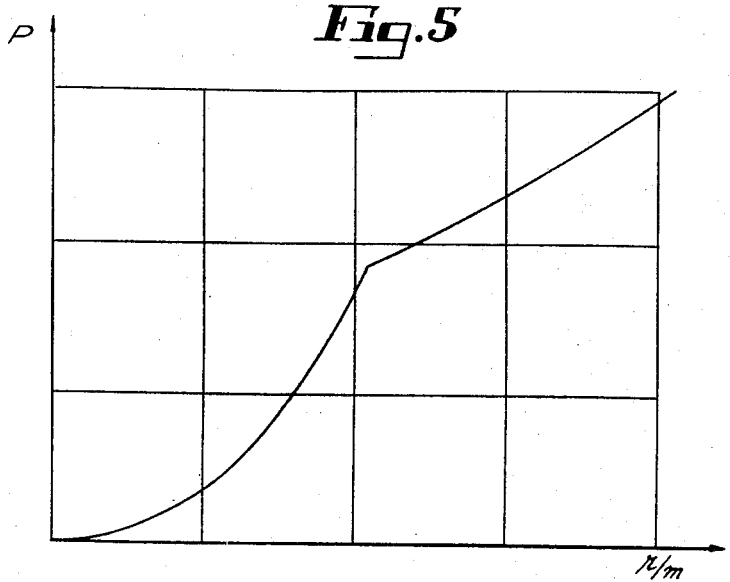

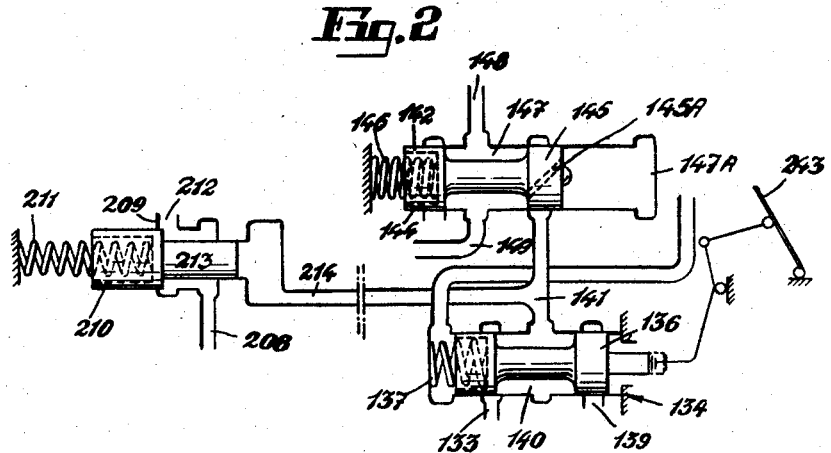
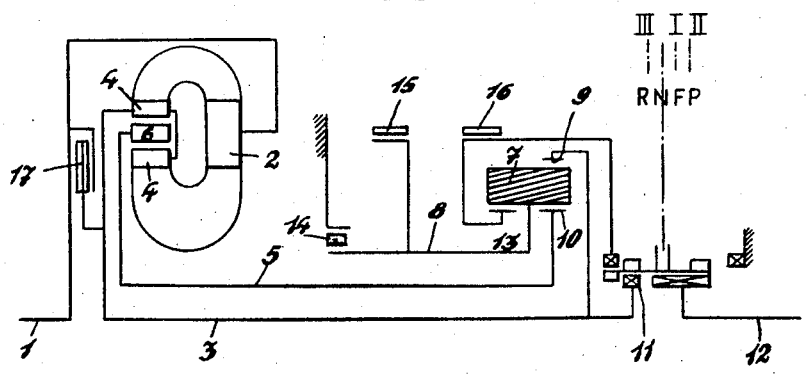

Nov. 17, 1959   E. V. QUISTGAARD ET AL   2,912,874
CONTROLLING MEANS FOR HYDRAULIC CHANGE SPEED GEARINGS
Filed March 10, 1953   5 Sheets-Sheet 4
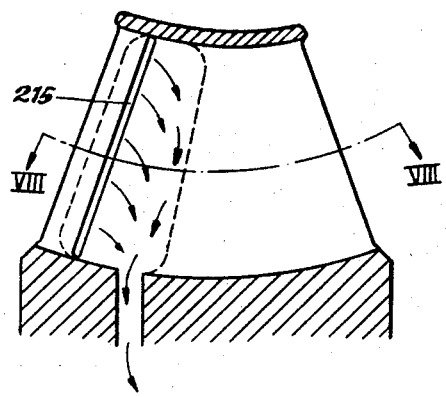
Fig.7
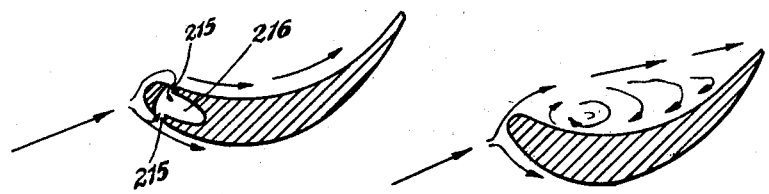
Fig.8
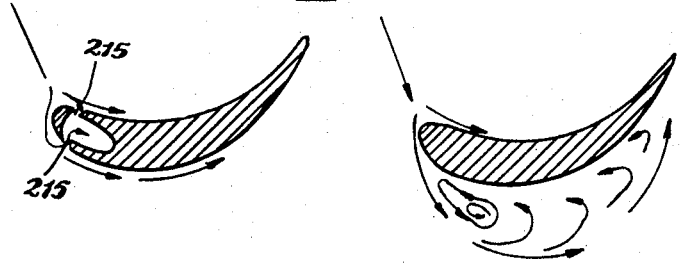

United States Patent Office 2,912,874
Patented Nov. 17, 1959

2,912,874

CONTROLLING MEANS FOR HYDRAULIC CHANGE SPEED GEARINGS

Erik Viuff Quistgaard and Sven-Olof Karlsson, Goteborg, Sweden, assignors to Aktiebolaget Volvo, Goteborg, Sweden, a corporation of Sweden Application March 10, 1953, Serial No. 341,470

Claims priority, application Sweden March 10, 1952

10 Claims. (Cl. 74—472)

The present invention refers to controlling means for hydraulic change speed gearings for motor vehicles provided with members for the shifting of the change speed gearing for different ratios of gear, said members being actuated by a governor driven from the engine. The arrangement according to the invention is principally distinguished by the feature that the power control of the driving engine is connected to a contrivance adapted the adjustment of the power control in the position of idle running, when the vehicle is standing still, to effect braking of the output shaft of the change speed gearing.

Further features of the invention will appear from an example of embodiment illustrated in the accompanying drawings.

Figure 1:
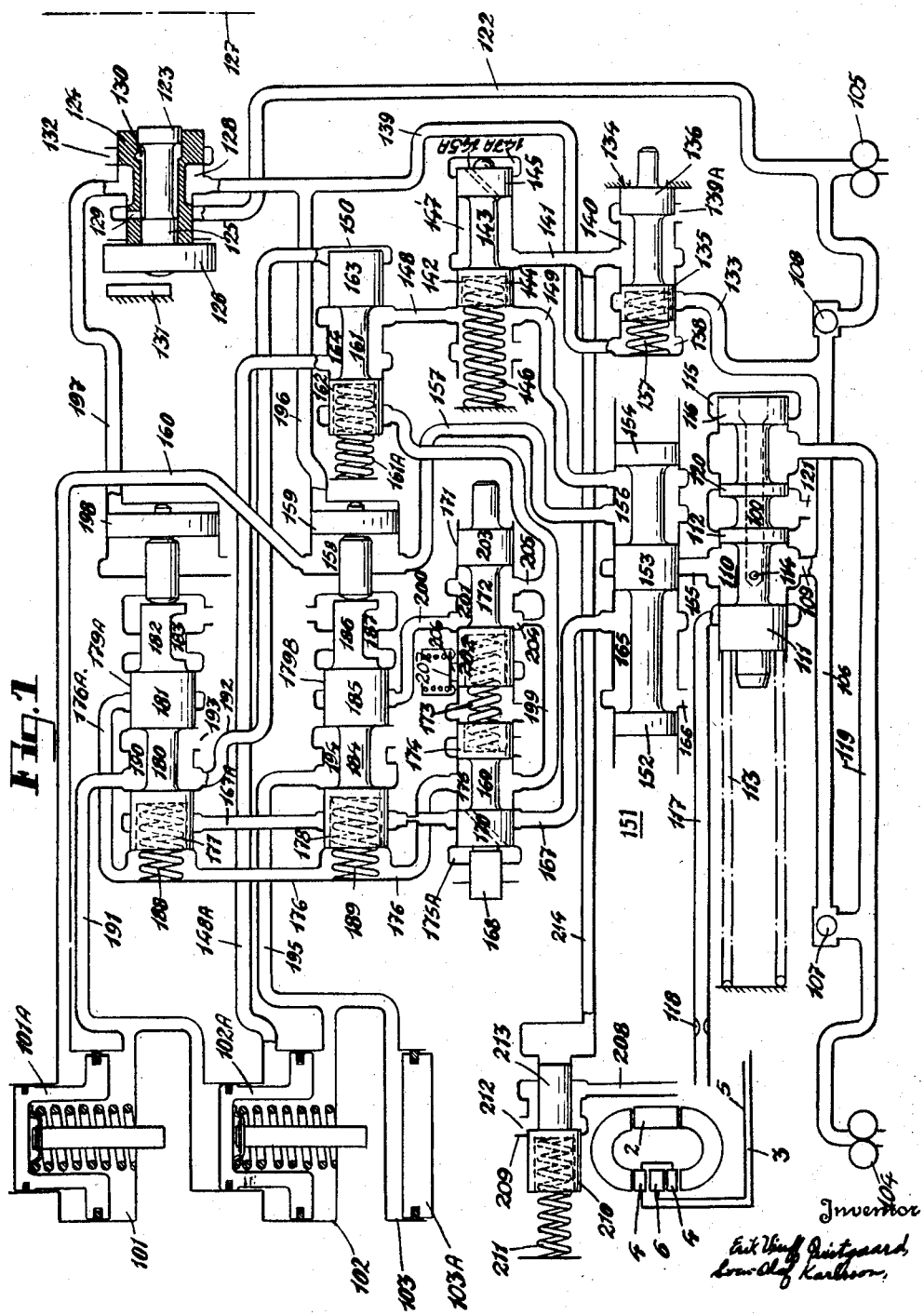
Figure 9:
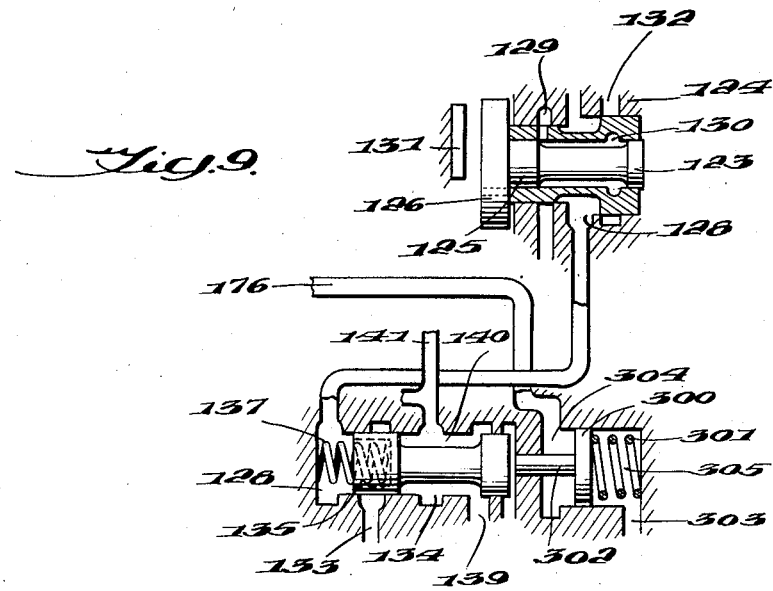
Figure 10:
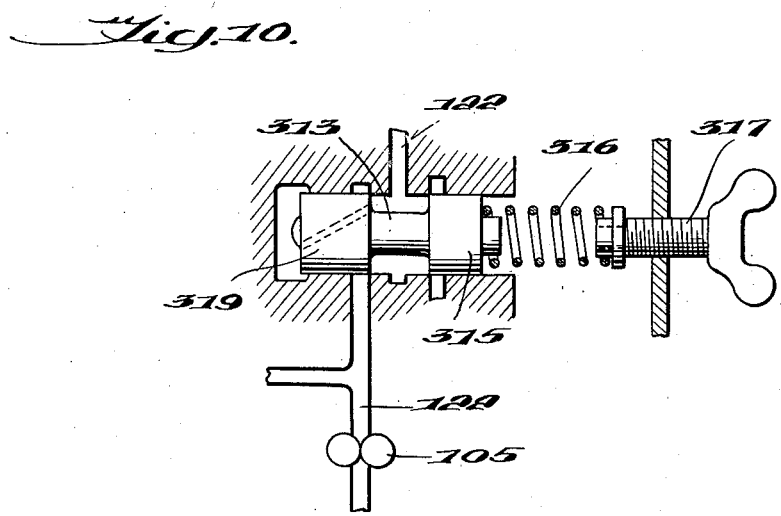

In the drawings, Fig. 1 represents a connecting diagram for the hydraulic control system, and Fig. 2 shows a detail of said connecting diagram in another operative position. Figs. 3 and 4 show a centrifugal governor comprised in the system, said figures showing the same in two different working positions. Fig. 5 illustrates a diagram showing the variation of the pressure of the fluid controlled by the governor as a function of the number of revolutions. Fig. 6 is a diagrammatic representation of a hydraulic change speed gearing adapted to be controlled by means of the controlling means according to Fig. 1. Figs. 7 and 8 show an arrangement for limit layer control at the blades of the torque converter contained in the change speed gearing. Fig. 9 illustrates a modification of piston means for actuating the relay valve in accordance with the fluid pressure of the throttle valve, and Fig. 10 illustrates a modification of pressure control valve means for controlling the fluid pressure transmitted to the centrifugal governor.

The controlling means illustrated in Fig. 1 is intended to be used for the hydraulic change speed gearing shown in Fig. 6. According to the latter figure, the input shaft of the change speed gearing driven by the engine is designated by 1, said shaft carrying a pump wheel 2. The turbine part of the torque converter is constructed as a double-rotation turbine, the first turbine shaft 3 carrying two blade rims 4, while the second turbine shaft 5 carries an intermediate guide blade rim 6. The two shafts 3 and 5 are mutually connected to a planet wheel contrivance comprising planet wheels 7 arranged on a holder 8. In the example shown, the turbine shaft 3 is connected to the ring wheel 9, while the turbine shaft 5 is connected to the sun wheel 10.

At the same time the turbine shaft 3 constitutes the output shaft of the change speed gearing for forward drive, and it may be connected, by means of a diagrammatically indicated coupling device 11, to the shaft 12 of the vehicle. For backward drive there is a special sun wheel 13, which likewise may be connected to the vehicle shaft 12 through the coupling contrivance 11.

At forward drive, with the use of double rotation, the reactive torque on the planet wheel holder 8 is taken up by a freewheel device 14. In driving backwardly, the planet wheel holder may be locked by means of a braking band 15. The sun wheel 13 and thus also the sun wheel 10 and the turbine shaft 5 may be locked by means of a braking band 16, whereby the turbine will operate as a single rotation turbine. Finally, a laminated coupling 17 is indicated diagrammatically, by means of which coupling the input shaft 1 may be connected directly to the turbine shaft 3.

The diagrammatically indicated coupling 11 may be adjusted into four different positions, that is to say, first, a neutral position, that shown in the drawing, second, a position for backward drive, third, a position for forward drive and, finally, a so-called parking position, in which the driving shaft 12 of the vehicle is non-rotatably connected to a fixed part of the vehicle. These four positions are designated in Fig. 6 from left to right by R (for reverse), N (for neutral), F (for forward drive), and P (for parking).

The change speed gearing above described may be controlled by means of a controlling device, which is indicated diagrammatically in Fig. 1. When the coupling 11 is adjusted for backward drive, the braking band 15 is to be pulled tight. In the neutral position, all couplings and braking bands are inoperative save for the special case of a stillstanding car and a released gas pedal, whereas, when the coupling 11 is adjusted for forward drive, the hydraulic controlling device is relied upon, at the start and in driving up to a certain speed, to keep the braking bands 15 and 16 as well as the laminated coupling 17 out of operation. The change speed gearing is now driven under double rotation conditions relative to the turbine, and the reactive torque is absorbed by the freewheel device 14. When a certain speed is exceeded, the braking band 16 is to be pulled tight, so that the shaft 5 is locked and the change speed gearing is driven under single rotation conditions in the turbine. At a further increase of the speed, the laminated coupling 17 is to be thrown into engagement while the braking bands 15 and 16 are loosened.

The braking bands 15 and 16 and the laminated coupling 17 are adapted to be operated with the aid of servomotor contrivances designated by 101, 102 and 103 in Fig. 1, the servo-motor 101 being adapted to be thrown into engagement at backward drive and in connection with a low gear ratio, while the servo-motor 102 is adapted to be thrown into engagement at forward drive under single-rotation conditions and the servo-motor 103 is thrown in at direct drive. To attain these functions, the controlling contrivance is devised in the following manner.

To bring about the requisite pressure in the control system, the latter is provided with two pumps 104 and 105, of which the pump 104 is driven by the engine of the vehicle, while the pump 105 is driven by the vehicle itself or from the driving axle thereof. Extending between the pumps is a conduit 106 having two non-return valves 107 and 108 connected into the same, in a manner such that pressure fluid from the one pump cannot enter the conduit system of the other pump. Extending from the conduit 106 is a branch conduit 109 opening into the space 110 between two piston members 111 and 112 on a piston slide 100, which is loaded by means of a spring 113. The piston slide has an aperture 114 proivded in the space 110, said aperture leading into a bore in the piston slide, said bore opening at the end of the slide remote from the spring 113 into a space 115, wherein the pressure acts upon a further piston 116 on the same slide. If the pressure in the conduit 106 is taken to be of sufficient magnitude, the whole piston slide will be displaced to the left in the figure against the action of the spring 113, the piston 111 being thus caused to open the inlet to an outlet conduit 117 having a throttle contrivance 118 comprised therein. The pressure in the space 110 will thus be dependent on the magnitude of the power originating from the spring 113.

Between the pump 104 and the non-return valve 107, a further branch conduit 119 extends from the conduit 106, said branch conduit leading into a space between the piston member 116 and a further piston member 120 on the piston slide 100. If the pressure in the conduit 106 increases, the piston slide is understood to be displaced comparatively far to the left in the figure, whereby the piston 120 will open a connection between the conduit 119 and a vent opening 121. Thus the pump 104 cannot produce any higher pressure in the conduit 106 but that said connection between the conduit 119 and the vent opening 121 is opened.

Extending between the pump 105 and the non-return valve 108 is a branch conduit 122, which leads to a centrifugal governor 123 to be described more closely hereinbefore, said governor being driven by the vehicle or from the driving axle of the vehicle. The pump 105 is of such a capacity in comparison with the pump 104, that, when the vehicle is moving under normal driving conditions, the non-return valve 107 closes and the pressure in the space 110 is increased so much that the connection between the conduit 119 and the outlet 121 is open. The pump 104 will thus operate more or less idly. When the speed of the vehicle is low, on the other hand, the pump 104 may assume the maintenance of pressure in the conduit 106, entirely or in part.

The diagrammatically indicated centrifugal governor 123 comprises an outer piston slide 124 having an inner piston slide 125 arranged therein, said inner piston slide carrying a weight 126 on its radially outer end. Both piston slides are made as differential pistons, the larger piston members being turned inwardly toward the diagrammatically indicated axis of rotation of the governor 127. The conduit 122 is controlled by the smaller piston member of the piston slide 124, in a manner such that pressure fluid from said conduit will be introduced into the space 128 between the two piston members of the piston slide 124, as soon as the governor commences to rotate, whereupon the whole arrangement 124, 125, 126 tends to become hurled out. Hereby pressure will be obtained in said space 128, so that the piston slide 124 is restrained. The radially inner position of the piston slide 124 is here determined by the fact that its larger piston member controls a vent opening 132. A complete tightening effect does not exist either at the mouth of the conduit 122 or at the vent opening 132, a certain flow going always on through the space 128, the piston slide 124 thus always balancing in a certain average position, where the outlet through the vent opening 132 is throttled more or less, so that the pressure in the intermediate space 128 will be able to restrain the slide.

Provided in the smaller piston member of the piston slide 124 is a channel 129, which is in continuous communication with the conduit 122 and with an intermediate space 130 between the two piston members of the smaller piston slide 125. The whole arrangement is so adapted that the pressure in the space 130 is only at lower numbers of revolutions of the governor capable of counteracting the centrifugal force, which is understood also to act upon the relatively heavy weight 126. At increasing numbers of revolutions, the weight 126 is moved outwardly so as to be caused to bear on an abutment 131 rotating with the governor and fixedly arranged in the radial direction. Hereby the inner piston slide 125 and the weight 126 which form a unit, will be disengaged from the governor system so that only the outer piston slide 124 serves as a governor weight for the continued control of the pressure in the intermediate space 128.

The function of the governor above described is illustrated in Figs. 3, 4 and 5. Fig. 3 shows the weight system 124, 125, 126 of the governor in the position taken by the same, as long as the oil pressure in the space 130 is capable of restraining the inner piston slide 125 and the weight 126 against the action of the centrifugal force. According to Fig. 4, the piston slide 125 has been moved outwardly, so that the weight 126 has been caused to bear on the fixed abutment 131. The pressure in the space 128 will thus rise comparatively strongly within the lower range of the numbers of revolutions, but less strongly within the higher range, as soon as the weight 126 has been caused to bear on the abutment 131, by reason of which the curve relative to the pressure as a function of the number of revolutions will take the course shown in Fig. 5.

Extending from the conduit 106 between the valves 107 and 108 is conduit 133 leading to a relay valve 134 comprising a piston slide with two piston members 135 and 136, of which the piston member 135 is adapted to control the conduit 133. The piston slide is actuated by a compression spring 137 cooperating with the piston member 135 and tending to move the piston slide into a position for the closure of the conduit 133. The spring 137 is arranged within a space 138 communicating through a conduit 139 with the space 128 in the governor 123. The pressure in the space 138 thus varies according to the diagram in Fig. 5 during the operation of the vehicle and likewise tends to close the conduit 133.

The piston member 136 is adapted to control a vent opening 139A for the space 140 between the piston members 135 and 136. A conduit 141 extends from this space to a pressure control valve 142.

As will appear from Fig. 2, the piston slide of the relay valve 134 is connected to the power control of the engine, indicated in the figure in the form of a gas pedal 243, which is kept in its upward position in known manner by means of a spring. In Fig. 2, which thus corresponds to the idle position of the power control, the piston member 136 covers the vent opening 139A, while the conduit 133 is open, for which reason the same pressure prevails in the space 140 as in the conduit 133. The same pressure also prevails in the conduit 141. The valve 142 comprises a piston slide 143 with two piston members 144 and 145. A spring 146 tends to move the piston slide 143 into the position shown in Fig. 1, in which the conduit 141 is in communication with the space 147 between the piston members 144 and 145. However, the piston member 145 is provided with a channel 145A uniting both sides of the piston member. When the gas control 243 takes its position corresponding to idle running and a pressure consequently prevails in the conduit 141 and thus also in the space 147, the piston slide 143 will be displaced to the left in Fig. 1, against the action of the spring 146, into the position shown in Fig. 2, in which the pressure in the spaces 147 and 147A is balanced by the spring 146.

When the slide 143 takes the position shown in Fig. 2, two conduits 148 and 149 extend from the space 147. The conduit 148 leads to the servo-motor 102 over a distribution valve 150 to be described more closely in the following, and conduit 148A for the purpose of pulling the brake band 16 in Fig. 6 tight, while the conduit 149 may be brought into communication with the servo-motor 101 over a selector valve 151, for the purpose of tightening the brake band 15 in Fig. 6.

The selector valve 151 comprises a piston slide with three piston members 152, 153 and 154. The position of this piston slide depends on and is controlled by the adjustment of the claw coupling 11 in Fig. 6. In the neutral position shown in Fig. 1, the intermediate piston member 153 cuts off a conduit 155, which connects the space 110 between the piston members 111 and 112 of the piston slide 100 with the selector valve 151. In this position, the conduit 149 opens into the space 156 between the piston members 153 and 154, and from the same space extends a conduit 157 to the space 158 on the one side of an operating piston 159, from which space a further conduit 160 leads to the servo-motor 101. If the gas pedal 243 is thus in its idle running position according to Fig. 2, and the space 147 of the pressure control valve is under pressure, the brake band 15 of the arrangement according to Fig. 6 will be in its tightening position.

The distribution valve 150 comprises a piston slide 161 with two piston members 162 and 163. The conduit 148 passes through the space 164 between said piston members when the slide 161 is in the position shown in Fig. 1, and thus the servo-motor 102 also pulls its brake band 16 tight in the idle running position of the power control 243 and with the selector valve adjusted in the neutral position.

If the gas pedal 243 is depressed, the spring 137 is enabled to displace the piston slide 134 to the right (Fig. 2), so that it will take the position shown in Fig. 1, in which the space 140 between the piston members 135—136 is vented or emptied through the conduit 139. Hereby the pressure valve 142 will also take the position shown in Fig. 1, and the conduits 148—149 are depressurized. The brake bands 15 and 16 will thus be released.

In connection with the adjustment of the coupling 11 in Fig. 6 for forward drive the selector valve 151 is displaced to the right in Fig. 1 for a distance such that the conduit 155 is uncovered by the piston member 153 in the selector valve. The space 165 between the piston members 152 and 153 will thus be pressurized, in that the piston member 152 has at the same time closed a vent opening 166 leading from said space in the neutral position. A conduit 167 extends from the space 165 to a throttle valve 168 dependent on the adjustment of the power control, said throttle valve comprising a piston slide 169. The conduit 167 is controlled by the one piston member 170 of the piston slide 169, said member having a through-bore in the same manner as the piston member 145 of the pressure control valve 142. The piston slide 169 is actuated by the power control over a so-called kick-down-valve 171, which comprises a piston slide 172 abutting against the other piston member 174 of the piston slide 169 over a compression spring 173. The spring 173 tends to displace the piston slide 169 to the left in the figure, but pressure fluid is now admitted into the space 175 between the piston members 170 and 174, and the pressure is propagated to the outside of the piston member 170, whereby the pressure in the space 175 and the space 175A will counteract the pressure of the spring 173. When the piston slide 172 of the kick-down-valve 171 is displaced to the left in Fig. 1 at the depression of the gas pedal, the spring 173 is strained, and the pressure in the space 175 between the piston members 170 and 174 will thus increase in connection with the depression of the gas pedal.

A conduit 176 extends from the space 175 to the outside of the end pistons 177 and 178 to two valve devices 179A and 179B. The valve device 179A comprises a piston slide 180, which in addition to the piston member 177 carries a piston member 181 and a stem 182, which is provided with an overflow passage 183. In the same manner the valve device 179B comprises a piston slide 184 with the piston member 178 and a further piston member 185 with a stem 186, which has an overflow passage 187 in it.

The pressure prevailing in the space 175 of the throttle valve 168 and depending on the position of the power control acts upon the piston slides 180 and 184 in a manner to cause the latter to be displaced to the right in Fig. 1. In the same figure, the two piston slides are acted upon by springs 188 and 189, respectively. A conduit 191 is connected to the space 190 between the piston members 177 and 181 of the piston slide 180, said conduit being branched so that one branch extends to the servo-motor 101 on the lower side of the piston 101A thereof, while the other branch extends to the upper side of the piston 102A in the servo-motor 102. A further conduit 192 extends from the space 109 and terminates at the outer end of the piston member 163 of the piston slide 161 in the distribution valve 150. Thus, if the space 190 is pressurized, this pressure will displace the piston slide 161 of the distribution valve 150 to the left in the figure. In the position of the piston slide 180 shown in Fig. 1, the space 190 is in a depressurized state on account of a vent opening 193 leading from the space 190.

From the space 194 between the piston members 178 and 185 on the piston slide 184, said space corresponding to the space 190, extends a conduit 195, which is branched in the same manner as the conduit 195, one branch extending to the lower side of the piston 102A of the servo-motor contrivance 102, while the other branch extends to the upper side of the piston 103A of the servo-motor contrivance 103.

As pointed out above, a conduit 139 extends from the space 128 of the centrifugal governor, said conduit having a pressure prevailing therein, which in a certain manner corresponds to the number of revolutions of the governor. Extending from the conduit 139 is a branch conduit 196 leading to the side of the operating piston 159 opposed to that of the space 158. The operating piston 159 is adapted to actuate the piston slide 184 of the valve device 179B in a direction opposed to that of the spring 189 and to the pressure in the conduit 176 depending on the position of the power control. From the space 128 of the governor extends a conduit 197 leading to an operating piston 198 in a manner corresponding to the conditions in the operating piston 159. The operating piston 198 acts upon the piston slide 180 in a direction opposed to that of the spring 188 and the pressure in the conduit 176, when the conduit 197 is under pressure.

If it be assumed that the coupling 11 is adjusted for forward drive and that the selector valve 151 is thus displaced to the right in Fig. 1 for a distance corresponding to the distance between the arrows N and D, but with the power control, that is to say the gas pedal, taking its idle running position in accordance with Fig. 2, and with the vehicle standing still, the servo-motors 101 and 102 are operative, both of them, the two brake bands 15 and 16 being thus pulled tight. The vehicle is thus prevented from rolling by itself. The space 128 of the centrifugal governor has no appreciable pressure prevailing therein, inasmuch as the governor is standing still, for which reason the valve devices 179A and 179B take the positions shown in Fig. 1. If the gas pedal 243 is now depressed, the relay valve 134 will take the position shown in Fig. 1, whereby the two brake bands 15 and 16 will be loosened. The turbine rims 4 and the guide blade rim 6 then commence to rotate, and the vehicle begins to move forwardly under double rotation conditions in the torque converter. The pressure thus rises successively in the space 128 of the centrifugal governor and thus also in the conduits 196 and 197. The whole plant is so adapted that the operating piston 159 calls for an appreciably greater pressure of the pressure fluid than does the operating piston 198 to permit of being displaced, for which reason the piston slide 180 is the first to commence its travel over to the left in Fig. 1. The piston member 181 will then throttle the vent opening 193, while the piston member 177 tends to uncover a conduit 167A constituting a continuation of the conduit 167 on the other side of the piston member 170 of the throttle valve.

A continuation 176A of the conduit 176 is extended to the piston member 181 of the piston slide 180, and when said piston slide is displaced to the left in Fig. 1, the conduit 176A will be uncovered on the right hand side of the piston member 181, while the end of the stem 182 will at the same time entirely fill up the opening through which it passes, whereby a pressure will build up on the right hand side of the piston member 181, said pressure corresponding to the pressure of the pressure fluid on the left hand side of the piston member 177. The piston slide 180 will thus take a table left-hand extreme position, as long as a certain pressure prevails in the conduit 197. The space between the piston members 177 and 181 will now have a comparatively high pressure prevailing therein, which is propagated through the conduit 191 to the lower side of the servo-motor piston 101A and the upper side of the piston 102A. The pressure propagates through the conduit 192 to the distribution valve 150, the piston slide 161 of which will be displaced to the left in Fig. 1 against the effect of its return spring 161A. Hereby the conduit 148 will be cut off, and the part 148A thereof, the upper one in the figure, will be brought into communication with a conduit 199 over the space 164, said conduit 199 extending from the space 175 between the pistons 170 and 174 on the piston slide 169 of the throttle valve. The pressure in this space propagates through the conduit 199 and through the conduit 148A to the annular upper side of the servo-motor piston 102A constructed as a differential piston. This piston will thus be acted upon both by the pressure in the conduit 191 and by the pressure in the conduit 148A, and will pull the brake band 16 tight in the arrangement according to Fig. 6. Hereby the torque converter of this contrivance will be operated under single rotation conditions.

On a continued increase of the number of revolutions of the governor, corresponding to an increased speed of the vehicle, the piston 159 will also be displaced by degrees to the left in Fig. 1. In the same manner as in the valve contrivance 179A, the conduit 195 of the valve contrivance 179B will then be connected to the pressurized conduit 167A. The piston member 185 then uncovers the opening of a conduit 200, which is connected to the space 201 between the piston member 202 and 203 of the piston slide 172 of the kick-down-valve 171. This space 201 is connected by means of two conduits 204 and 205 to the conduit 199 in the position shown in Fig. 1, and in connection with a normal drive the piston slide 172 will never through an actuation from the power control be displaced so far to the left in the figure that both of said conduits would be cut off. By the fact that the conduit 200 is uncovered by the piston member 185 on the piston slide 184, the pressure in the space 175 of the throttle valve will also prevail on the right hand side of the piston member 185, by reason of which the piston slide 184 will take a stable extreme position on the left. In this position, the pressure in the conduit 195 and consequently on the lower side of the servo-motor piston 102A and the upper side of the servo-motor piston 103A is thus the same as in the conduit 167, that is to say higher than the pressure in the conduit 148A, but the same as the pressure in the conduit 191, on account of which the servo-motor piston 102A will be displaced upwardly so as to loosen the brake band 16 by reason of the difference in pressure and the spring power. At the same time the laminated coupling 17 is tightened, and direct connection will be obtained between the engine shaft 1 and the driving axle 12 of the vehicle, while all elements of the change speed gearing are free.

The pressure in the conduits 196 and 197, that is to say on the righthand side of the operating pistons 159 and 198 in Fig. 1, is dependent on the speed of the vehicle, whereas the pressure in the space 175 of the throttle valve 168 and thus on the left hand side of the piston members 178 and 177 of the valve contrivances 179B and 179A, respectively, is dependent on the position of the power control. It should thus be understood, that if in driving under direct coupling conditions a certain increase of the speed is not obtained in spite of the depression of the gas pedal, but the speed falls perhaps instead on account of an up-incline, the piston slide 184 of the valve device 179B will primarily be displaced to the right in Fig. 1 back to the position shown on account of a high pressure in the conduit 176 and too low a pressure in the conduit 196. Hereby the pressure disappears on the upper side of the servo-motor piston 103A operating the laminated coupling 17 (Fig. 6) and on the lower side of the servo-motor piston 102A adapted to pull the brake band 16 tight. In this way the change speed gearing in thrown into engagement at single rotation conditions of the torque converter. For example, should the speed decrease further in spite of the position of the gas pedal being maintained, there will in the same manner be a transition to driving under double rotation conditions of the moment converter by the fact that the piston slide 180 returns into its extreme right-hand position.

Sometimes it may be desirable, when driving under direct coupling conditions, to pass over to driving over the change speed gearing, without this being otherwise called for by the operating conditions. This is effected so that the gas pedal is depressed into its bottom position for a short while, whereby the piston slide 172 of the kick-down-valve 171 is displaced so far to the left in Fig. 1 that the piston member 202 of the same uncovers a vent opening 206 provided with a spring-loaded valve 207. At the same time the conduit 205 is closed by the piston member 203, so that compressed fluid is supplied to the space 201 only through the relatively narrow conduit 204. The valve 207 is so adapted that the pressure in the space 201 becomes comparatively low, so that the power acting upon the right-hand side of the piston member 185 in the figure becomes immaterial. At the same time a momentary increase of the pressure in the conduit 176 will be obtained by reason of the compression of the spring 173, which results in that the piston slide 184 of the valve contrivance 179B is displaced to its extreme right position against the effect of the pressure in the conduit 196. Hereby a transition to operation over the change speed gearing under single rotation conditions in the moment converter thereof takes place. On account of the depression of the gas pedal 243 and thus of the kick-down-valve 171, the engine will increase its number of revolutions, which results in a greater tractive power (a change up of the moment) and an increased vehicle speed (acceleration), until the control pressure in the conduit 196 again forces the valve system 179B to the left by reason of the increased speed.

As long as the vehicle is in motion, a pressure is understood to exist on the left hand side of the piston member 135 of the relay valve 134, by reason of which the piston slide of this valve is kept in the extreme right-hand position shown in Fig. 1, even if the gas pedal is permitted to take its upper released position. As soon as the vehicle has been brought to a standstill, said pressure disappears, however, and the piston slide is then moved by the spring of the gas pedal 243 to the position shown in Fig. 2, whereby the servo-motors 101 and 102 are caused to function and to pull the brake bands 15 and 16 (Fig. 6) tight, so that the vehicle is prevented from rolling. As soon as the gas pedal is depressed again, said brake bands are immediately loosened, however.

Fig. 1 contains a diagrammatic representation of the hydraulic torque converter comprised in the change speed gearing according to Fig. 6, said torque converter being supplied with compressed fluid through the conduit 117 over the throttle device 118, which is preferably controllable. Extending from the torque converter is an outlet conduit 208 passing through a valve device 209, which comprises a piston slide 210 actuated by a compression spring 211 tending to move the piston slide 210 to a position such that a vent opening 212 leading from the valve is closed. The pressure in the conduit 208 is thus dependent on the spring power in consideration. However, the piston slide 210 is provided with a stem-like portion 213, the free end of which is subjected to the pressure of the compressed fluid in a conduit 214, constituting a branch conduit from the conduit 141. Since according to the above said conduit 141 is depressurized, as long as the gas pedal is depressed, but is pressurized, as soon as the gas pedal is permitted to take its upper idle running position and the vehicle is standing still, it will be understood that with a standing vehicle the piston slide 210 counteracts the spring 211 in the valve 210, so that the pressure in the torque converter falls in a marked degree. Hereby the step-up of the torque of the converter is decreased, and the torque transmitted onto the shafts 3 and 5 becomes comparatively low, so that the requisite braking power for the bands 15 and 16 (Fig. 6) is lowered.

With a high ratio between the numbers of revolutions of the pump wheel 2 and the turbine rims 4 and 6, for instance in starting, this might cause separation of fluid from the blades. To avoid this as far as possible it will be found suitable to increase the pressure in the torque converter, on the one hand, and also to provide the torque converter with means for a boundary layer control at such points where separation is to be feared, on the other hand. Figs. 7 and 8 show how the blades of an axial flow turbine, for example, may be fitted with gaps 215 leading inwardly to a cavity 216 in the blade, from which extends a suitably arranged outlet 217. Fig. 8 shows on the left a blade provided with slits at two different angles of incidence of the fluid, whereas two solid blades are shown on the right with corresponding angles of incidence, the courses of the flow being indicated diagrammatically. As will be seen, eddies will form at the solid blades with separation and losses in consequence thereto. The blades of the torque converter may be constructed in a similar manner, the compressed fluid supplied to the converter then deviating at least in part through the slits in consideration. The arrangement may then preferably be made in such manner that the pressure in the converter is augmented with an increasing ratio of the number of revolutions, which also involves an increased flow through the converter. This is favourable both with respect to the flow and from the point of view of cooling.

Fig. 1 indicates how the piston slide 152, 153 and 154 of the selector valve 151 may take a position corresponding to a displacement of the same to the right from the position shown for a distance which is equal to the distance between the arrows N and L. In this position, the space 165 between the piston members 152 and 153 will establish communication between the conduit 155 on the one hand and the conduit 167 as well as the conduit 157 on the other hand. Hereby the operating piston 159 will always be subjected to pressure on its left-hand side in the figure, for which reason it will never be able to transfer the piston slide 184 into the extreme left-hand position, in which a transition to direct coupling takes place. Driving then proceeds solely under double rotation or single rotation conditions, which is advantageous under certain circumstances. When driving under double rotation conditions, the brake band 15 is pulled tight, the freewheel arrangement 14 being thus unloaded, besides which engine braking is made possible.

Finally, the piston slide 152, 153 and 154 of the selector valve 151 may be displaced from the position shown in Fig. 1 to the left for a distance corresponding to the distance between the arrows N and R. Hereby communication is established solely between the conduit 155 and the conduit 157, which latter is understood to pass through the space 158 and to merge into the conduit 160 leading to the servo-motor 101, so that the latter is caused to function. At the same time, the claw coupling 11 in the arrangement according to Fig. 6 is understood to be adjusted in such manner that rearward drive will be obtained at double rotation of the torque converter. Inasmuch as the conduit 167 is cut off, no switchings can take place in other respects.

The operating member for the coupling 11 in the arrangement according to Fig. 6 is preferably connected with the selector valve 151 in Fig. 1, in a manner such that the positions corresponding to the neutral position and the parking position of the first-mentioned operating member correspond to one and the same position of the selector valve, and to pass over from the normal operating position in forward driving to driving solely at double rotation and single rotation one has to perform a special manual displacement of the piston slide of the selector valve alone.

In the plant described above a direct mechanical connection is taken to exist between the gas pedal 243 and the piston slide of the relay valve 134. However, the throttle valve is also understood to be actuated mechanically from the gas pedal, the pressure in the space 175 in the piston slide 169 thereof then constituting a measure of the magnitude of the depression of the gas pedal. It will thus be possible to modify the construction of the relay valve in a simple manner, so that the spring power originating from the gas pedal is replaced by a piston, which is acted upon by the compressed fluid from said space 175 in the throttle valve, as shown in Fig. 9 in which a piston 300 acts by means of a rod 302 upon the relay valve 134. The space 304 communicates through the conduit 176 with the space 175 in the throttle valve 168. Consequently, the pressure in space 304 will be equal to the throttle pressure. A spring 301 tends to move the piston 300 towards the left as shown in Fig. 9. The space 305 to the right of the piston 300 communicates with a vent opening 303. By the incorporation of means, with the aid of which the pressure in the conduit 122 may be varied, it will also be possible to vary the speed at which the piston slide 125 of the governor, is transferred from the position shown in Fig. 3 to the position according to Fig. 4. Hereby the appearance of the diagram according to Fig. 5 may be altered. To this end, a pressure control valve may be inserted in the conduit 122 to vary the pressure of the fluid transmitted to the centrifugal governor, as shown in Fig. 10. A piston slide 313 comprises piston members 314 and 315, the last-named member being acted upon by a spring 316 the tension of which is adjustable by means of a screw 317. The piston slide constitutes a pressure control valve, the pressure of the fluid leaving said valve being solely dependent upon the tension of the spring 316.

What we claim is:

1. In a motor vehicle having an engine with an output shaft, power control means controlling the speed of operation of said engine, a vehicle drive shaft, and hydraulic change speed gearing means connecting said engine output shaft to said vehicle drive shaft, said change speed gearing including planetary gearing operably controlled by brake band means; hydraulic means controlling the drive speed ratio of said change speed gearing means comprising a fluid actuated servo-motor connected to said brake band means, a relay valve operably controlling said servo-motor, a pressure control valve connected intermediate said relay valve and and said servo-motor, governor means operably controlling said relay valve in accordance with the speed of travel of said vehicle to cause said servo-motor to disengage said brake band means, and means responsive to the position of said engine power control means when said power control is adjusted into the idle running position when the vehicle is motionless for operably controlling said relay valve means to cause said servo-motor to engage said brake band means.

2. In a motor vehicle having an engine with an output shaft, power control means controlling the speed of operation of said engine, a vehicle drive shaft, and hydraulic torque converter change speed gearing means connecting said engine output shaft to said vehicle drive shaft, said change speed gearing including planetary gearing operably controlled by brake band means; hydraulic means controlling the drive speed ratio of said change speed gearing means comprising a fluid actuated servo-motor connected to said brake band means, a relay valve operably controlling said servo-motor, governor means operably controlling said relay valve in accordance with the speed of travel of said vehicle to cause said servo-motor to disengage said brake band means, means responsive to the position of said engine power control means when said power control is adjusted into the idle running position when the vehicle is motionless for operably controlling said relay valve means to cause said servo-motor to engage said brake band means, and valve means for reducing the pressure of the fluid in said hydraulic torque converter when the engine power control means is shifted toward the idle running position and the vehicle is motionless.

3. Apparatus as defined in claim 2 wherein said torque converter is supplied with compressed fluid continuously, said converter having an outlet, and said valve means reducing the pressure of the fluid in said torque converter controls the venting of said outlet in accordance with the operation of said relay valve.

4. Apparatus as defined in claim 3 wherein said converter includes rotor blade parts, guide blade parts and wall parts, one of said parts being provided with openings adapted for a boundary layer control, through which openings compressed fluid supplied to the converter deviates.

5. Apparatus as defined in claim 4 and further including means for increasing the torque converter fluid pressure at high speed.

6. In a motor vehicle having an engine with an output shaft, power control means controlling the speed of operation of said engine, a vehicle drive shaft, and hydraulic change speed gearing means connecting said engine output shaft to said vehicle drive shaft, said change speed gearing including planetary gearing operably controlled by brake band means; hydraulic means controlling the drive speed ratio of said change speed gearing means comprising a fluid actuated servo-motor connected to said brake band means, a relay valve operably controlling said servo-motor, governor means operably controlling said relay valve in accordance with the speed of travel of said vehicle to cause said servo-motor to disengage said brake band means, said governor means being of the centrifugal type having a radially-movable differential piston slide, fluid pressure means connected to said relay valve and throttled by said piston slide and counteracting the centrifugal force so that the compressed fluid has a pressure behind the governor which rises with the rate of revolutions thereof, the cylinder of said piston slide having an inlet controlled by the smaller piston member and an outlet intermediate its ends, and means responsive to the position of said engine power control means when said power control is adjusted into the idle running position when the vehicle is motionless for operably controlling said relay valve means to cause said servo-motor to engage said brake band means.

7. Apparatus as defined in claim 6 wherein the cylinder of said piston slide further includes a vent opening controlled by the larger piston member.

8. Apparatus as defined in claim 6 wherein the portion between the larger and smaller piston members constituting said differential piston communicates with the compressed fluid inlet of the governor.

9. Apparatus as defined in claim 8 and which further includes a stopping device separated from the piston slide to restrict the movement of the innermost piston member in a radial outward direction.

10. In a motor vehicle having an engine with an output shaft, power control means controlling the speed of operation of said engine, a vehicle drive shaft, and hydraulic change speed gearing means connecting said engine output shaft to said vehicle drive shaft, said change speed gearing including planetary gearing operably controlled by at least two brake means; hydraulic means controlling the drive speed ratio of said change speed gearing means comprising at least two fluid actuated servo-motors connected one to each of said brake means, a relay valve operably controlling said servo-motors, governor means operably controlling said relay valve in accordance with the speed of travel of said vehicle to enable said servo-motors to disengage said brake means, and means responsive to the position of said engine power control means when said power control is adjusted into the idle running position when the vehicle is motionless for operably controlling said relay valve to cause said servo-motors to engage said brake means.

References Cited in the file of this patent

UNITED STATES PATENTS

| | | |
|---|---|---|
| 2,375,031 | Orr | May 1, 1945 |
| 2,375,816 | Orr | May 15, 1945 |
| 2,409,541 | Carnagua | Oct. 15, 1946 |
| 2,457,729 | Roberts et al. | Dec. 28, 1948 |
| 2,549,125 | Paton | Apr. 17, 1951 |
| 2,574,821 | Forman | Nov. 13, 1951 |
| 2,591,342 | Dodge | Apr. 1, 1952 |
| 2,640,372 | Dodge | June 2, 1953 |
| 2,645,137 | Roche | July 14, 1953 |
| 2,679,768 | Baule | June 1, 1954 |
| 2,757,552 | English | Aug. 7, 1956 |

UNITED STATES PATENT OFFICE
CERTIFICATE OF CORRECTION

Patent No. 2,912,874                                  November 17, 1959

Erik Viuff Quistgaard et al.

It is hereby certified that error appears in the above numbered patent requiring correction and that the said Letters Patent should read as corrected below.

In the grant, line 1, in the signature to the drawings, Sheets 1 to 5 inclusive, and in the heading to the printed specification, line 4, name of co-inventor, for "Sven-Olof Karlsson", each occurrence, read -- Sven-Olof Karlsson, now by change of name, Sven-Olof Kronogard --.

Signed and sealed this 14th day of June 1960.

(SEAL)
Attest:

KARL H. AXLINE
Attesting Officer

ROBERT C. WATSON
Commissioner of Patents